United States Patent
Ngo et al.

(10) Patent No.: US 9,209,691 B2
(45) Date of Patent: Dec. 8, 2015

(54) FAST TRANSIENT BUCK REGULATOR WITH DYNAMIC CHARGE/DISCHARGE CAPABILITY

(71) Applicants: Huy X. Ngo, San Jose, CA (US); Donald Wile, San Jose, CA (US)

(72) Inventors: Huy X. Ngo, San Jose, CA (US); Donald Wile, San Jose, CA (US)

(73) Assignee: Adaptive Digital Power, Inc., San Jose, CA (US)

(*) Notice: Subject to any disclaimer, the term of this patent is extended or adjusted under 35 U.S.C. 154(b) by 122 days.

(21) Appl. No.: 13/892,134

(22) Filed: May 10, 2013

(65) Prior Publication Data
US 2014/0333277 A1  Nov. 13, 2014

Related U.S. Application Data (63) Continuation-in-part of application No. 12/889,217, filed on Sep. 23, 2010, now Pat. No. 8,461,815.

(60) Provisional application No. 61/278,107, filed on Oct. 5, 2009, provisional application No. 61/278,108, filed on Oct. 5, 2009, provisional application No. 61/278,109, filed on Oct. 5, 2009, provisional application No. 61/278,127, filed on Oct. 5, 2009, provisional application No. 61/278,128, filed on Oct. 5, 2009, provisional application No. 61/278,129, filed on Oct. 5, 2009.

(51) Int. Cl.
*H02M 3/158* (2006.01)
*H02M 3/156* (2006.01)

(52) U.S. Cl.
CPC ...... *H02M 3/158* (2013.01); *H02M 2003/1566* (2013.01)

(58) Field of Classification Search
CPC .. Y02B 70/1458; H02M 3/155; H02M 3/156; H02M 2003/1566; H02M 3/158; H02M 3/1588
USPC ............... 323/223, 225, 268, 271, 272, 282
See application file for complete search history.

(56) References Cited

U.S. PATENT DOCUMENTS

| | | | |
|---|---|---|---|
| 8,076,915 B2* | 12/2011 | Nakazawa | 323/271 |
| 8,461,815 B1* | 6/2013 | Ngo | 323/271 |
| 8,692,527 B2* | 4/2014 | Ritamaki et al. | 323/269 |
| 2002/0054499 A1* | 5/2002 | Tanaka et al. | 363/132 |

* cited by examiner

*Primary Examiner* — Gary L Laxton
(74) *Attorney, Agent, or Firm* — Tran & Associates (57) ABSTRACT

Systems and methods are disclosed to control a buck converter with a first switching circuit including a first upper power transistor coupled to a first lower power transistor at a first junction; a second upper power transistor coupled to a second lower power transistor at a second junction; an inductor coupled to the first and second junctions; and a load coupled to the second junction.

19 Claims, 9 Drawing Sheets

FAST TRANSIENT BUCK REGULATOR WITH DYNAMIC CHARGE/DISCHARGE CAPABILITY

This application is a continuation in part of application Ser. No. 12/889,217 filed Sep. 23, 2010, which in turn is a nonprovisional application of and claims priority to U.S. Provisional Application Ser. Nos. 61/278,107; 61/278,108; 61/278, 109; 61/278,127; 61/278,128; and 61/278,129, all of which were filed on Oct. 5, 2009, the contents of which are incorporated by reference.

BACKGROUND

The present invention relates to a fast transient buck regulator with dynamic charge/discharge capability.

Switching regulators are commonly used to step-down a higher level, unregulated input voltage to a regulated output voltage. The simplest way to reduce a DC voltage is to use a voltage divider circuit, but voltage dividers waste energy, since they operate by bleeding off excess power as heat; also, output voltage isn't regulated (varies with input voltage). Other types of linear voltage regulators tend to be inefficient. Often, the power devices used in linear voltage regulators must dissipate a large amount of power. Consequently, the linear regulators must be cooled, either by mounting them on heat-sinks or by forced-air cooling (e.g., a fan), resulting in the loss of efficiency. In applications where size and efficiency are critical, linear voltage regulators are generally not used.

In applications requiring DC-DC conversion from a relatively high input voltage, a switching regulator will dramatically improve conversion efficiency relative to linear regulator alternatives. A buck converter, or step-down switch mode power supply, may also be referred to as a switch mode regulator. Buck converters are often used to step down the voltage in a given circuit. Buck converters receive a high direct current (DC) voltage source and, accordingly, output a lower desired DC voltage. Popularity of the buck converter is due to its high efficiency and compact size. The buck converter can be used in place of bulky linear voltage regulators at high voltage inputs.

Conventional buck converters often can include one or more switches, which can be implemented by MOSFETs (Metal-Oxide-Semiconductor-Field-Effect-Transistors). The switches, which are commonly controlled by a multiphase oscillator, can alternate between connecting and disconnecting a voltage source to circuits that drive the desired output. Hence, the duty cycle of the switching determines the output voltage. In addition, a pulse-width modulation (PWM) circuit commonly controls the switching with each switch receiving a different phase of the PWM over the complete period of the oscillator frequency.

Figure 1A:
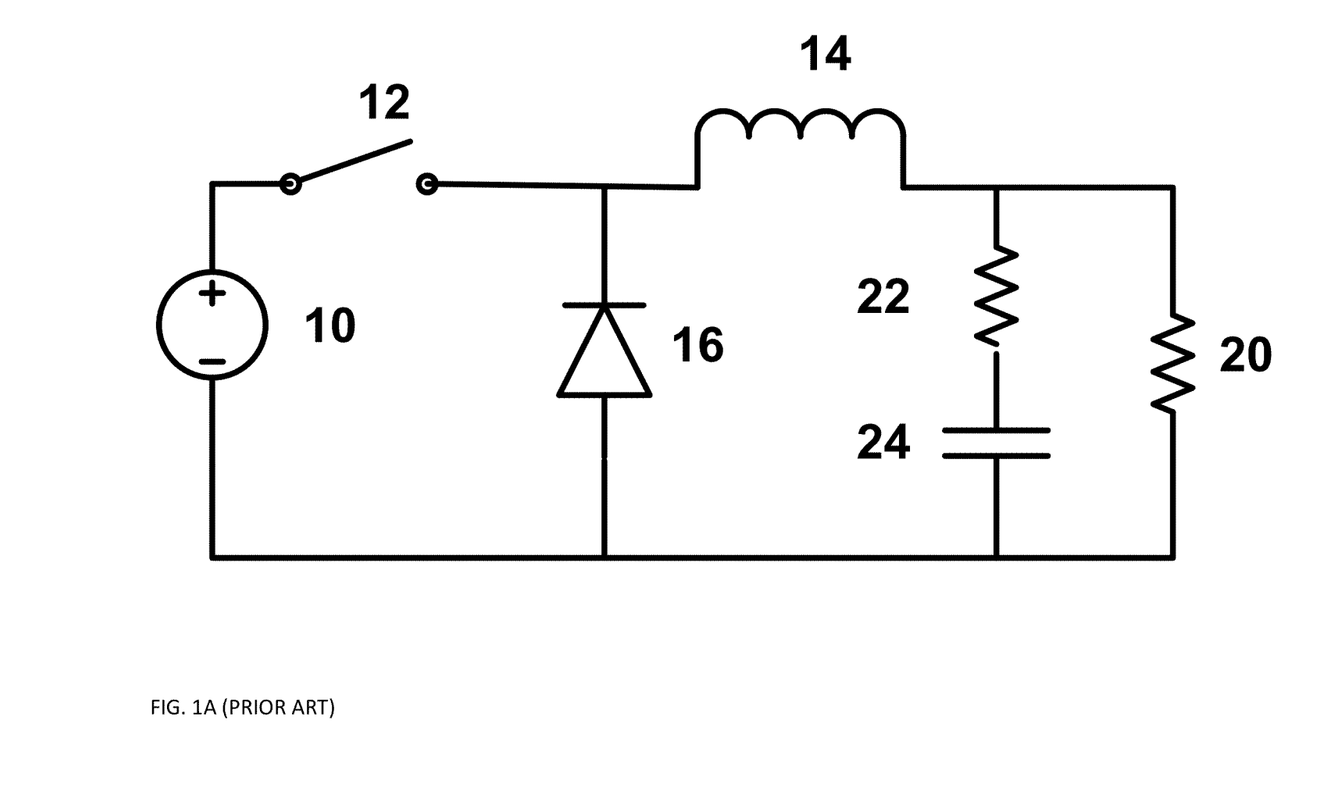
FIG. 1A shows a conventional buck converter.

FIG. 1A shows an idealized block diagram of a conventional buck converter. A power source 10 such as a battery provides power to be converted. The converter includes an inductor 14 and two switches (usually a transistor 12 and a diode 16) that control the inductor 14. The switch alternates between connecting the inductor 14 to source voltage to store energy in the inductor 14 and discharging the inductor 14 into a load. The load can be modeled as a resistive part 20 and a capacitive part with Rc 22 and capacitor 24.

Buck converters can include multiple parallel channels to process one or more of the voltage sources to drive a common output. Each channel can be substantially similar and often includes at least one inductor. The input terminal of the inductor is switched between the voltage source and ground. The DC current through each inductor is proportional to the duty cycle of its PWM signal and the value of the voltage source. Each inductor has a current limit. Typically, more PWM circuits are used when more output current is desired. The output terminals of all the inductors are electrically connected to provide a single output of the power conversion circuit. The output terminals of all the inductors are tied together and therefore have at least approximately identical voltages. The input terminal of each inductor has a rectangular wave voltage signal, which is derived from the voltage source and ground. The duty cycles of the rectangular wave voltage signals of respective channels are affected by variations in the respective PWM circuits and switches (e.g., design tolerances, offsets, and timing variations). A slight difference in the duty cycle can produce a significant difference in the DC current through the inductor in each channel.

U.S. Pat. No. 7,541,794 discusses a buck converter, having (i) an oscillator, (ii) a pulse width modulator, (iii) and a non-overlap clock generator and level shifter. The buck converter can convert input voltage ranging from approximately 3V to 5V down to approximately 0.7-1.0V, 1.2V, 1.5V, 1.8V, 2.5V, and 3.3V without the use of resistor dividers.

Figure 1B:
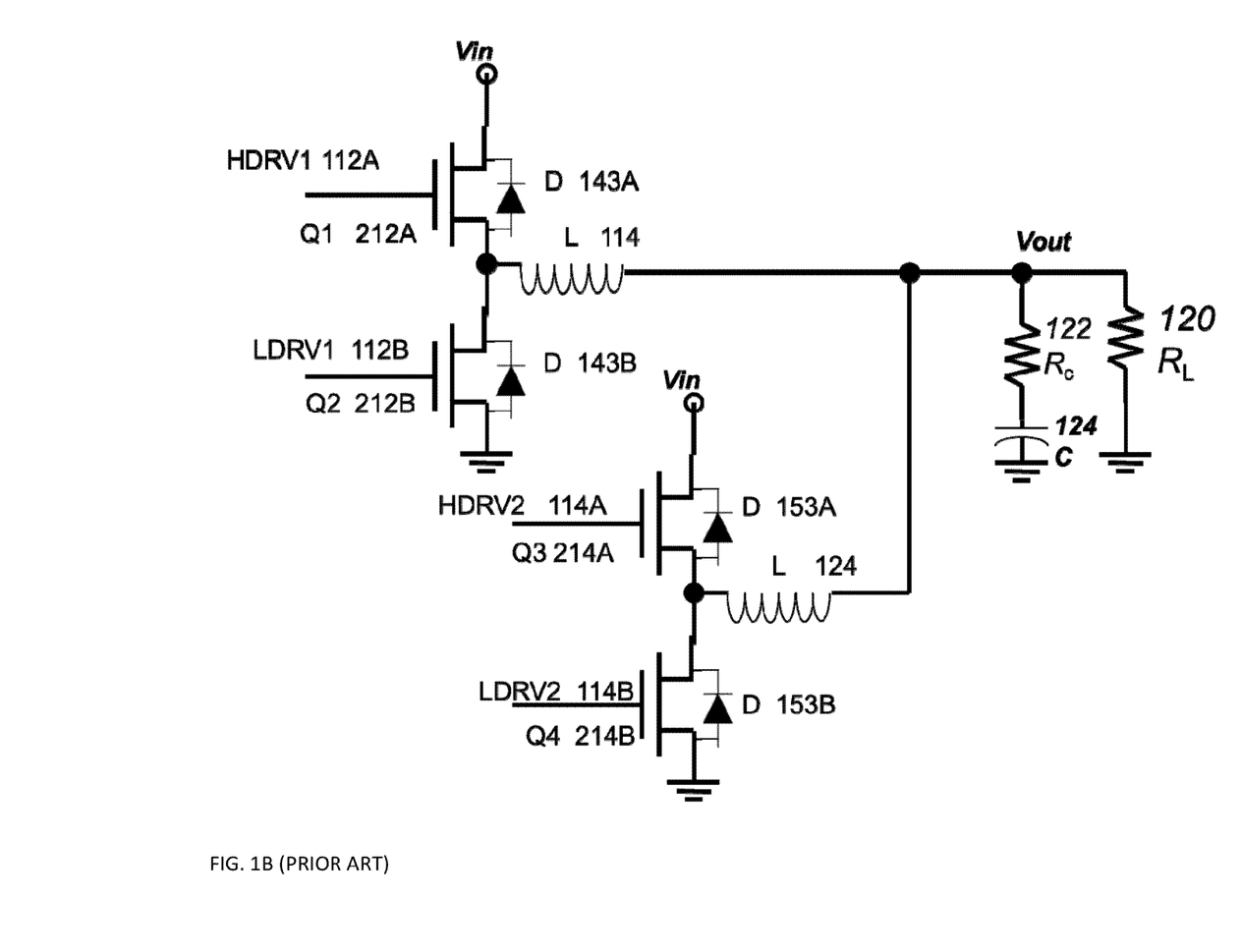
FIG. 1B shows a conventional multi-phase converter.

FIG. 1B shows a conventional multi-phase converter. The circuit uses two or more sets of upper and lower switches each driving an inductor. Control signal HDRV1 112A controls the gate of Q1 212A with body diode D 143A, while control signal LDRV1 112B controls the gate of Q2 212B with body diode 143B. Correspondingly control signal HDRV2 114A controls the gate of Q3 214A with body diode D 153A, while control signal LDRV2 114B controls the gate of Q4 214B with body diode 153B. Inductor 114 is connected to the junction where Q1 212A, Q2 212B meets. Inductor 124 is connected to the junction where Q3 214A, Q4 214B meets. The other end of inductor 114 is connected to resistive load 120 and to capacitive load having Rc 122 and capacitor 124.

Figure 1C:
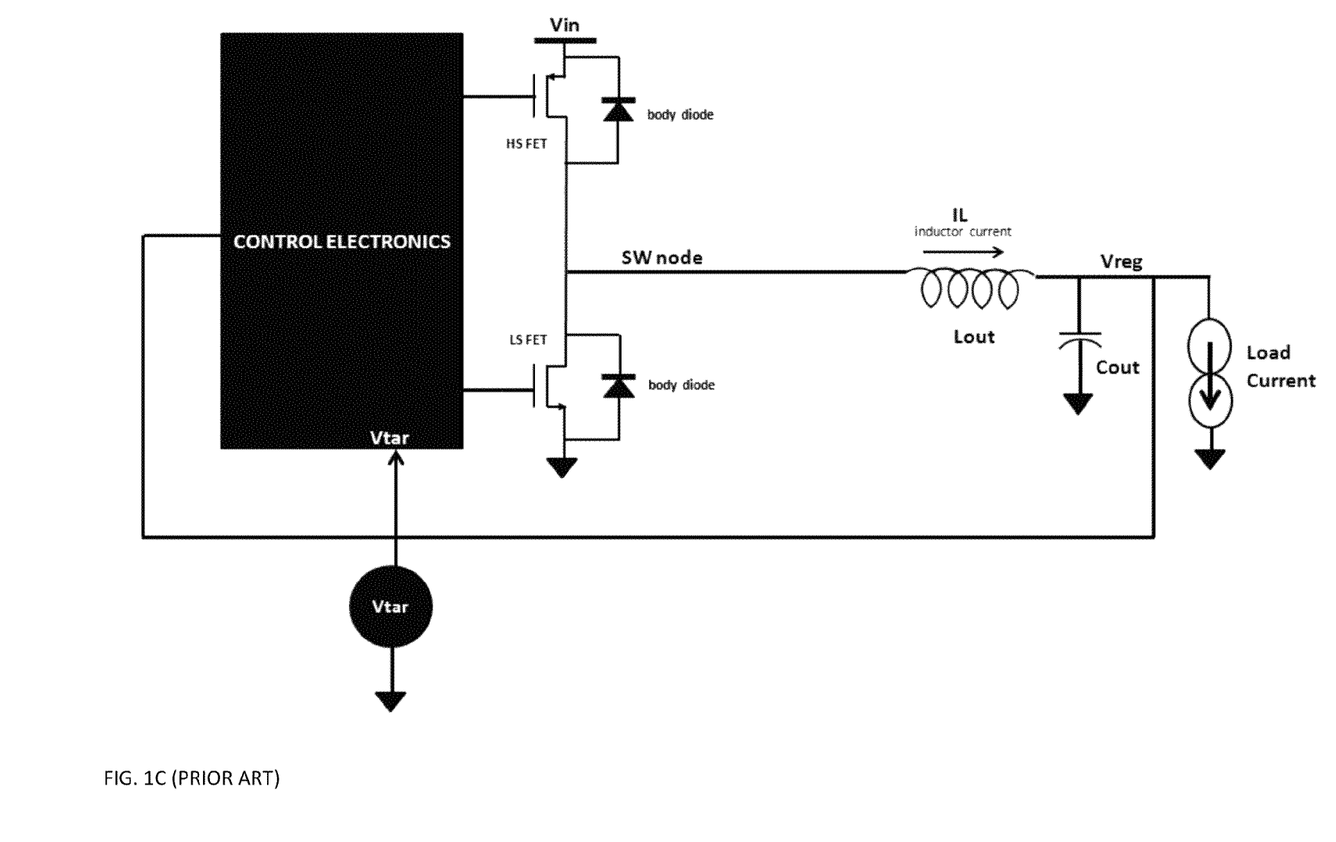
FIG. 1C shows another conventional buck regulator.

The transient response of a voltage regulator is an important figure of merit for the regulator. All voltage regulators output a constant voltage; however, the transient response of the regulator is a measure of how constant the output voltage is maintained as the load through the regulator changes. Today, most high current regulators are built using switching topologies in order to maximize their efficiency. For example, a BUCK regulator is composed of a high side FET (HS FET) and a typically a low side FET (LS FET), output inductor, output capacitor and control electronics, as shown in FIG. 1C. The regulator shown in FIG. 1C transforms the input voltage, Vin to a lower output voltage Vreg by controlling the on and off times of the HS and LS FETs. Feedback forces Vreg to equal Vtar, which is the desired output target voltage of the regulator. The HS and LS FETs can be idealized as switches that connect the SW node to either Vin or to ground. When the SW node is connected to Vin (though the HS FET) inductor current increases as given by formula #1:

$$IL=[(Vin-Vreg)/Lout]*t_{HS} \qquad \text{Formula \#1:}$$

Where: IL=inductor current
Vin=input voltage
Vreg=regulator output voltage
Lout=output inductor value
$t_{HS}$=amount of time the HS FET is turned on
Similarly when the SW node is connected to ground (through the LS FET) the inductor current decreases as given by formula #2:

$$IL=[(0-Vreg)/Lout]*t_{LS} \qquad \text{Formula \#2:}$$

Where: IL=inductor current
Vin=input voltage

Vreg=regulator output voltage
Lout=output inductor value
$t_{LS}$=amount of time the LS FET is turned on There are two components to the transient response, load start and load release. The load start transient is negative going while the load release transient is positive going. In a traditional switching regulator, the transient response is determined by a combination of factors including: inductor value, output capacitor value, input voltage, output voltage, amount of load current change, rate of load current change and control electronics. That being said, there are some generalizations that can be made. The load start transient is minimized when the inductor current is allowed to increase rapidly to supply the increased load current. Inductor current increases more rapidly with higher input voltages (Vin), lower output voltages (Vreg), and smaller inductor value. This combination results in a larger positive voltage across the inductor when the HS FET turns on, which according to formula #1 produces more inductor current. The load release transient is minimized by larger output voltages which results in a larger negative voltage across the inductor when the LS FET turns on (as shown by formula #2). The larger the negative voltage across the inductor, the more quickly the positive inductor current (into the load) can be decreased, thereby reducing the load release transient. Both the load start and load release transients are reduced with lower inductor values as well as larger output capacitance. Increasing the amount of output capacitance is expensive due to an increase in the board space required for the additional capacitance, as well as the extra cost for the output capacitors. Reducing the inductor value degrades the regulator efficiency as well as increasing the amount of output ripple. Thus it is desirable to find a means to improve the load start and load release transients that don't impact the output inductor or output capacitor values.

SUMMARY

In one aspect, systems and methods are disclosed to control a buck converter with a first switching circuit including a first upper power transistor coupled to a first lower power transistor at a first junction; a second upper power transistor coupled to a second lower power transistor at a second junction; an inductor coupled to the first and second junctions; and a load coupled to the second junction.

Implementations of the above aspect may include one or more of the following. The second upper power transistor turns on when the output voltage falls below a predetermined voltage (called the Load Start Threshold). The second upper power transistor turns off when the output voltage rises above a predetermined voltage (which could also be the Load Start Threshold). The second lower power transistor turns on when the output voltage exceeds a predetermined voltage (called the Load Release Threshold). The second lower power transistor turns off when the output voltage falls below a predetermined voltage (which could also be the Load Release Threshold). The first and second switching circuits perform pseudo-multiphase Buck regulation requiring only one inductor regardless of the number of phases done in the Buck regulator. The system provides a faster transient response due to the charge/discharge action of the second upper power transistor Q2 and lower power transistor Q4. The system works with a smaller output capacitor due to charge/discharge action of Q2 in the second circuit, thus reducing system cost.

DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Figure 2:
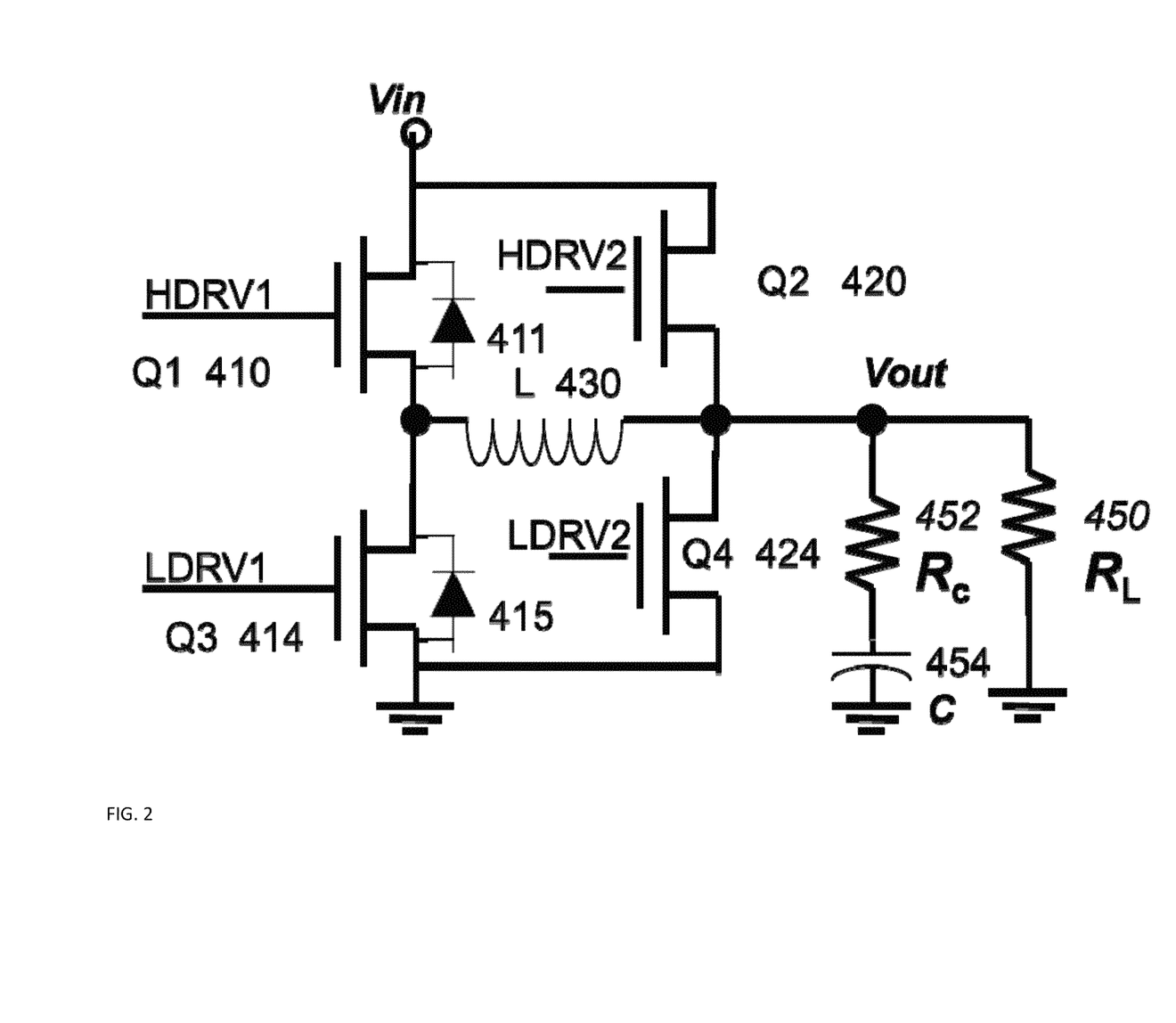
FIG. 2 shows a fast transient Buck regulator with dynamic charge or discharge circuit.

Turning now to FIG. 2, a fast transient Buck regulator with dynamic charge and discharge circuit is shown. The Buck regulator includes a first upper driver generating an HDRV1 signal to control power transistor Q1 410 and a first lower driver generating a LDRV1 signal to control power transistor Q2 414. A first body diode 411 is connected to the first upper power transistor Q1 410 and a second body diode 415 is connected to the first lower power transistor Q3 414.

The Buck regulator also includes a second upper driver generating an HDRV2 signal to control power transistor Q2 420 and a second lower driver generating a LDRV2 signal to control power transistor Q4 424. HDRV2 and LDRV2 operate Q2 and Q4 as current sources rather than switches. Inductor L 430 is positioned between the junctions of Q1 410 and Q3 414 and Q2 420 and Q4 424, respectively. The other end of inductor L 430 is connected to a resistive load 450 and to a capacitive load having resistor Rc 452 and capacitor C 454.

Figure 3A:
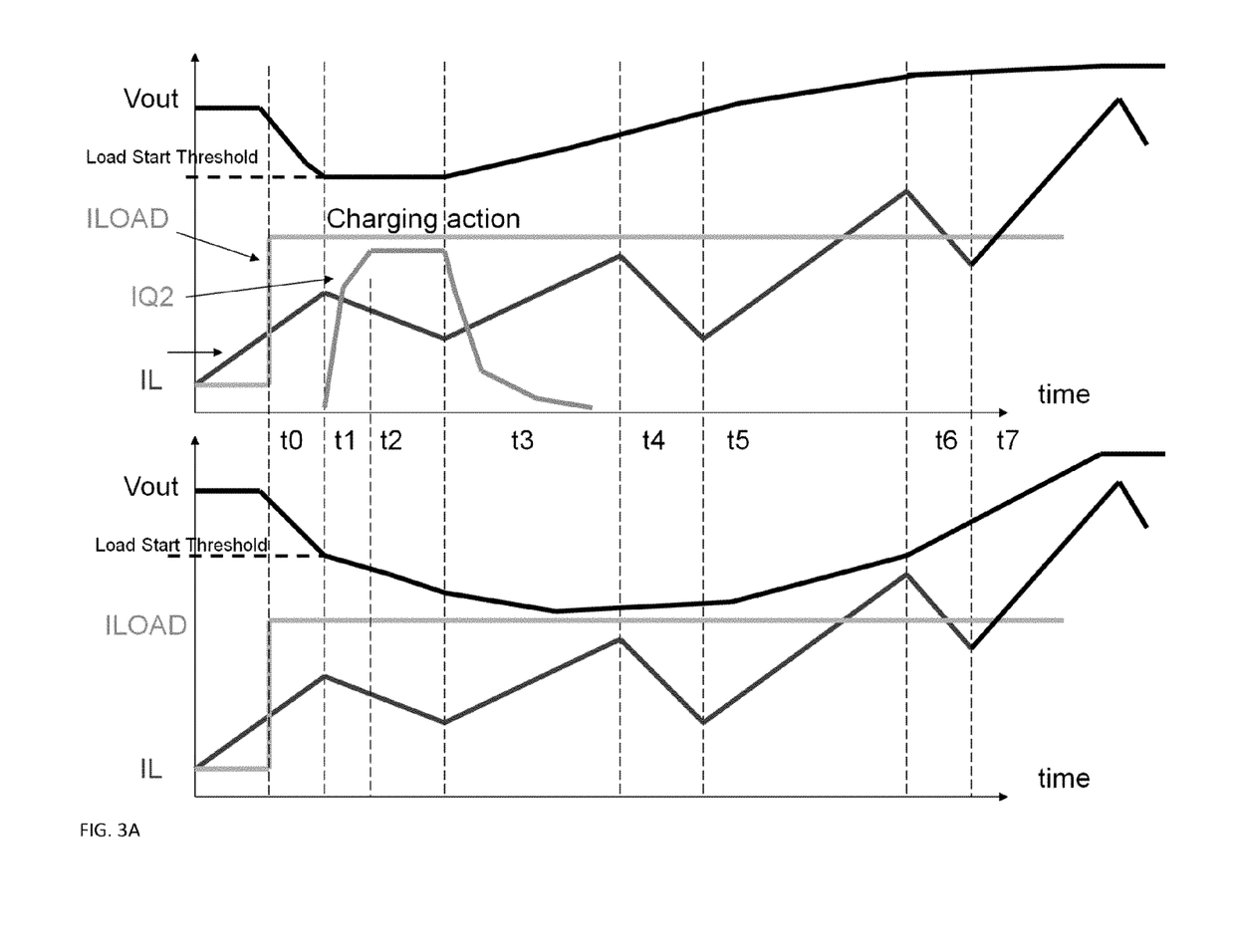
FIGS. 3A-3B show exemplary timing diagrams illustrating the operation of the invention.
Figure 3B:
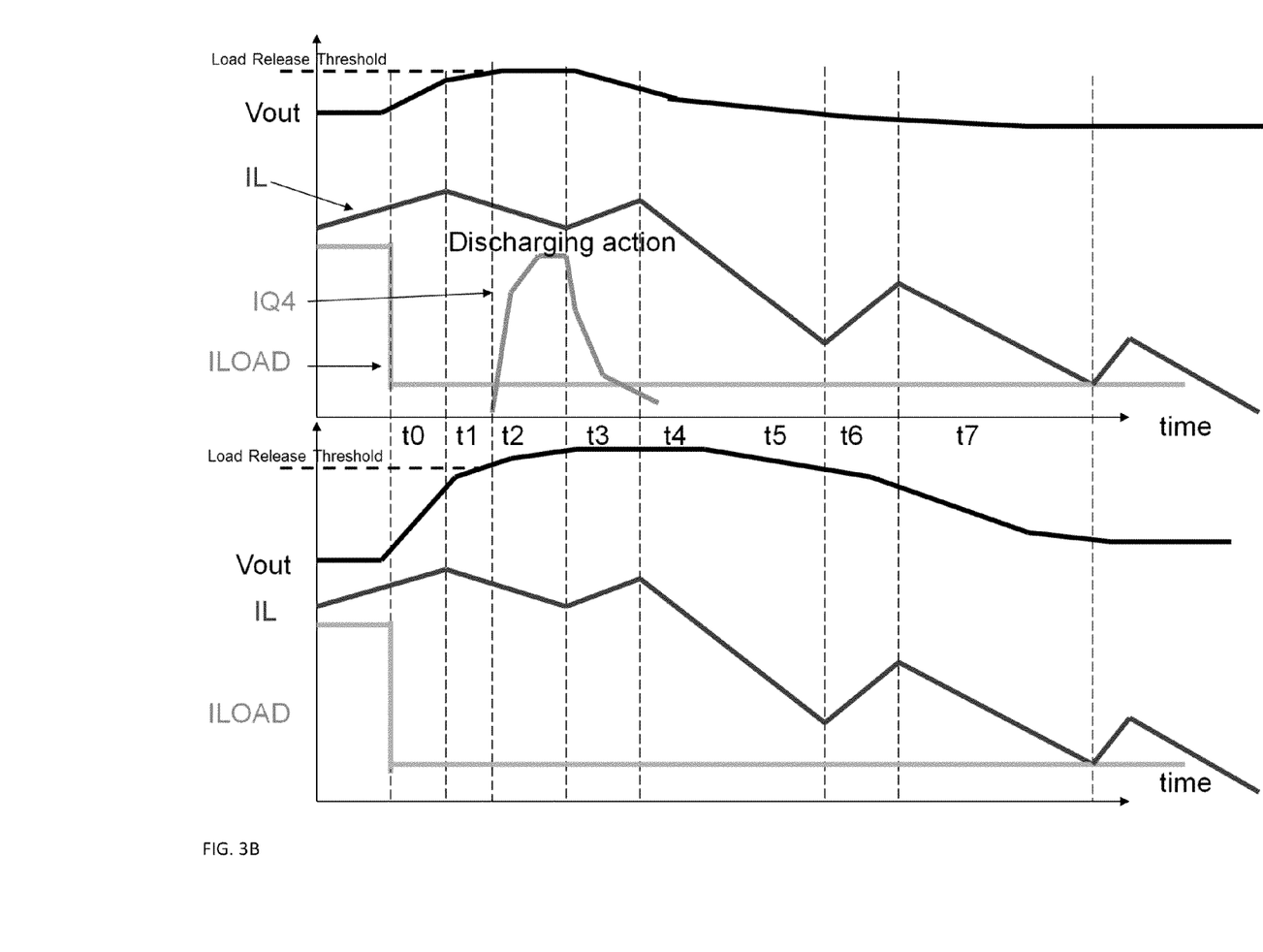

The Buck converter's transient response is dependent on inductor 430. A smaller inductor allows quicker response at the expense of high current ripple and high output voltage ripple. In the configuration of FIG. 2, when output voltage drops (due to a rapid increase in the load current) below a pre-defined level, Q2 420 is turned on to charge the capacitance quickly. The on time of Q2 is determined by T=K1*C/dV+K2*ILOAD where C is the capacitance value, dV is the output voltage drop, K1 and K2 are gain factors, and ILOAD is the load current. The same principle is applied for Q4 424 which is turned on when the output voltage exceeds a pre-defined level (due to a rapid decrease in the load current). Exemplary timing diagrams illustrating operation are shown in FIGS. 3A-3B.

Figure 4:
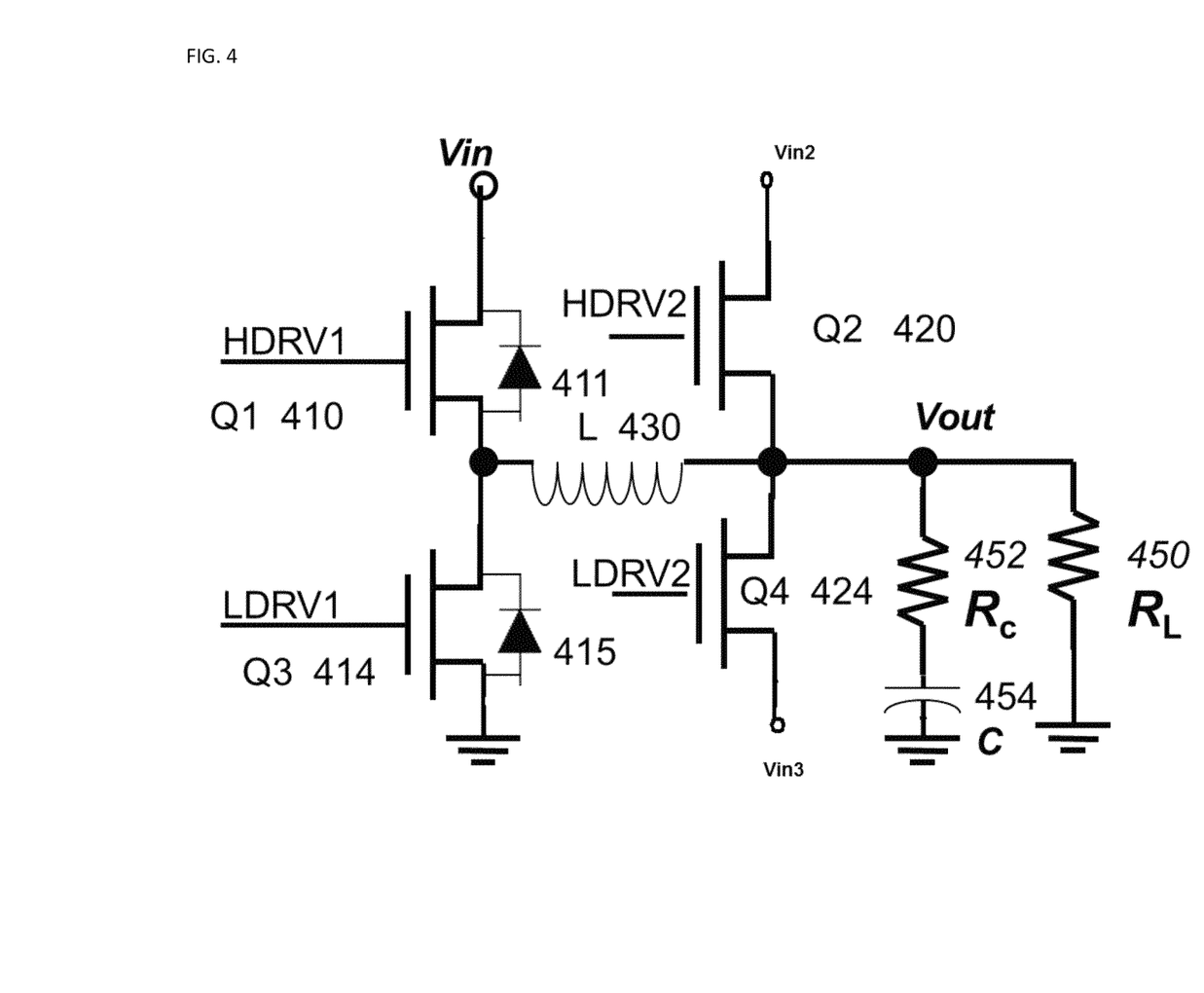
FIG. 4 shows exemplary graphs illustrating the operations of the system of FIG. 2.

FIGS. 4 shows exemplary graphs illustrating the operations of the system of FIG. 2. At the top FIG. 4, ILOAD 610 is turned on at time t0 to drive a charging action and cause the inductor current IL 614 to ramp up. The current at Q2 IQ2 612 is on from period t1 until period t3. This causes the output voltage Vout 620 to drop in period t0 to the lowest point at period t2 (crossing the Load Start Threshold) and increases thereafter. At the bottom of FIG. 4, IQ2 612 is not on, and Vout 620 reaches its lowest value during period t3 and then increases. The drop in Vout in the lower graph is greater than the drop in Vout shown in the upper graph, due to the charging action of the IQ2 612 current. The charging current IQ2 612 starts to decrease after Vout increases above the Load Start Threshold.

A corresponding graph illustrating a discharging action is discussed next. At period t0, ILOAD 610 is turned off to drive a discharging action. The inductor current IL 614 ramps down after period t0. The current at Q4 IQ4 630 is on from period t1, as Vout exceeds the Load Release Threshold, and starts to decrease at period t3 when Vout drops below the Load Release Threshold. At the bottom of FIG. 4B, IQ4 630 is not on, and Vout 620 reaches its highest value during period t3 and then falls back to its normal level. The increase in Vout 620 in the lower graph is much larger than the increase in Vout 620 in the upper graph.

In a second variation of FIG. 2, Vin2 is not necessarily the same as Vin, Vin3 is not necessarily the same as GND in all the claims before. We may have plural of Q2 with plural of distinct or overlapped Vin2, plural of Q4 with plural of distinct or overlapped Vin3. Because transistors Q2 and Q4 operate as current sources when they are on, they can have large voltages across their respective drains and sources (ex. [Vin2–Vout] for Q2 and [Vout–Vin3] for Q4). These transistor voltage drops in combination with the current supplied by these transistors, results in significant power dissipation during the time that Q2 and Q4 are on. If on the other hand, Vin2 is less than Vin (but greater than Vout) and Vin3 is greater than ground (but less than Vout), the voltages across Q2 and Q4 are reduced. As a result, the amount of power dissipated in Q2 and Q4 is reduced when these transistors conduct current. Another advantage of using Vin2<Vin and Vin3>ground is that transistors Q2 and Q4 can be built in a lower voltage rated process than Q1 or Q3 (which must support the higher Vin voltage). This is significant in that it allows Q2 and Q4 to be integrated with other low voltage circuits reducing the packaging cost and silicon area (which also translates to cost).

A block diagram of the fast transient suppressor connected to a buck regulator can have the following major elements:
1. Load Start detector: comp #1 and LS_TH comparator threshold
2. Load Start FET connected to Vreg
3. Load Start Gate Control: which controls the load start current from the Load Start FET
4. Load Release detector: comp #2 and LR_TH comparator threshold
5. Load Release FET connected to Vreg
6. Load Release Gate Control: which controls the load release current from the Load Release FET In the case of a load start event, the regulator output (Vreg), will decrease below Vtar. This is because the current in the output inductor can't increase rapidly enough to immediately supply the load start current. If the amount of decrease exceeds the LS_TH threshold, then the output of COMP #1 (comparator #1) will go high and activate the Load Start Gate Control circuit. Once activated, the Load Start Gate Control circuit turns on the Load Start FET such that it supplies a controlled amount of current (as set by the programmable current control input to the Gate Control circuit in conjunction with the I to V converter). The Load Start FET does not act as a switch but rather acts as a current source, supplying the load start current to the load. Similarly, in the case of a load release event, the regulator output (Vreg), will increase above Vtar. This increase occurs because the energy stored in the inductor has no place to go except into the output capacitor, thereby increasing the voltage across the output capacitor. If the amount of increase exceeds the LR_TH threshold, then the output of COMP #2 (comparator #2) will go high and activate the Load Release Gate Control circuit. Once activated, the Load Release Gate Control circuit turns on the Load Release FET such that it supplies a controlled amount of current to the load (determined by the programmable current control input to the Gate Control circuit as well as the I to V converter). In this case, the Load Release FET does not act as a switch but rather acts as a current source, supplying the load release current to the load.

Connecting the Load Start and Load Release FETs directly to the regulator output, without going through an inductor, guarantees a fast transient response. An inductor would slow down the response because as seen by the well known equation V/L=(dI/dt) which shows that the change in current in the inductor ,in response to the changing load current, is limited to V/L (where V=voltage across the inductor and L=the value of inductance of the inductor). Bypassing the inductor allows the Load Start or Load Release current to the load, to change instantaneously.

Figure 5:
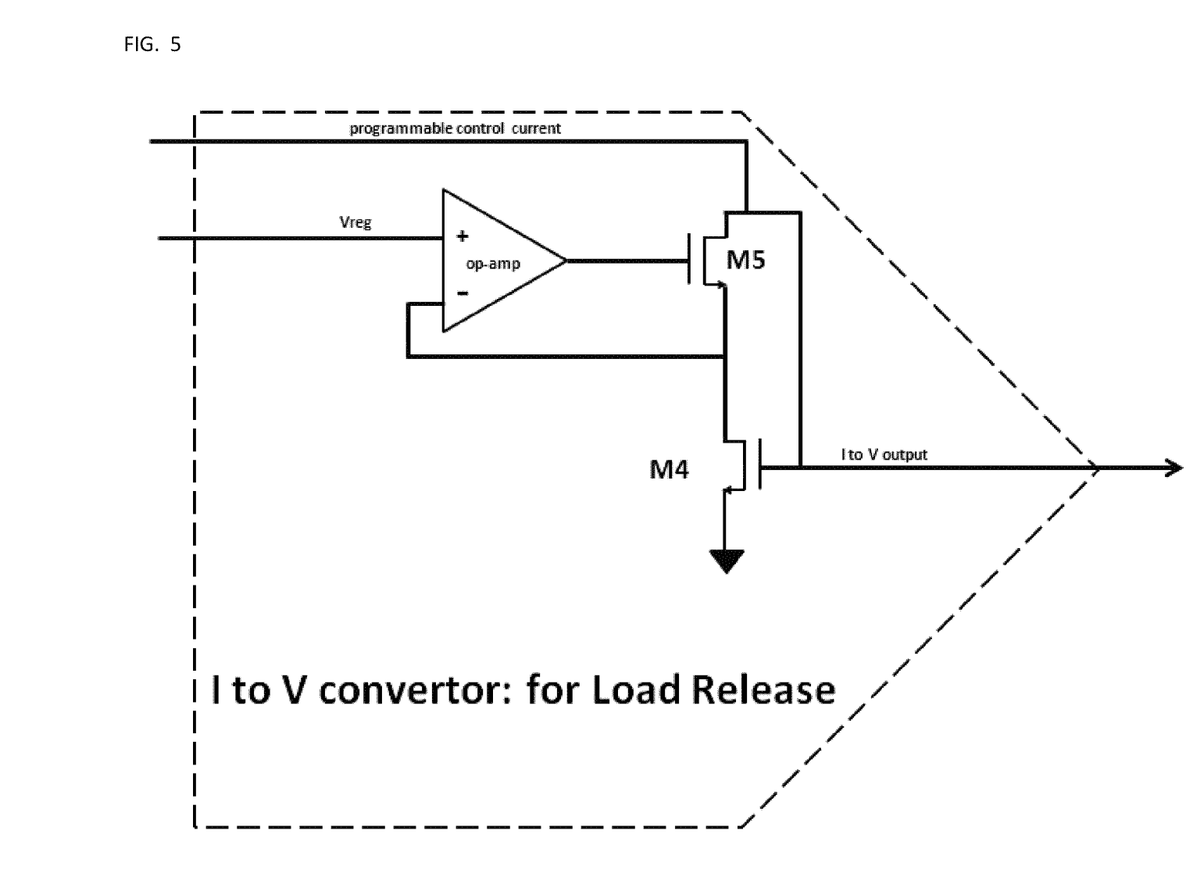
FIG. 5 shows a block diagram of a Load Release I to V converter.

FIG. 5 shows a block diagram of a Load Release I to V converter, while FIG. 11 shows a block diagram of a Load Start I to V converter. Load release is discussed next. Ideally the amount of Load Release current supplied by the Load Release FET is equal to the amount of current in the load just prior to the load release. In practice, however, this is not necessary. Most systems only require that the Load Release transient be less than some percentage of the output voltage, thus some amount of Load Release transient is acceptable. As such, it is only necessary for the Load Release FET to supply a portion of the change in the load current. Supplying too much $I_{LR}$ will cause a Load Start transient dip in Vreg. The amount of Load Release current supplied by the FET is designed to be programmable in order to allow for a tradeoff between the Load Release and Load Start transients. It is also possible to set the amount of $I_{LR}$ by use of feedback. In this circumstance, the amount of $I_{LR}$ supplied would be a function of the magnitude of the Load Release transient in conjunction with the loop gain of the load release system.

Once turned on, the Load Release FET must not be turned off immediately even if the regulator output drops below the load release threshold. Immediately turning off the Load Release FET would in turn create another load release transient resulting in an oscillation wherein the Load Release FET would fire then turn off then fire then turn off . . . etc. As such, the Load Release FET must be turned off gradually. When turned on, the Load Release FET operates in its saturated mode (i.e. as a current source), with its gate voltage controlled to generate a known amount of load release current. Gradually turning off the Load Release FET requires removing the drive to the Load Release FET gate and allowing the gate to discharge slowly as a result of a light discharge path from the gate of the Load Release FET to ground (this is shown in the Load Release gate control circuit as Rdis1).

Next load start is discussed. The ideal amount of Load Start current, $I_{LS}$, supplied by the Load Start FET is equal to the increased current in the Load. Most systems only require that the Load Start transient be less than some percentage of the output voltage, thus some amount of Load Start transient is acceptable. As such, it is only necessary for the Load Start FET to supply a portion of the change in the load current. Supplying too much $I_{LS}$ will cause an output overshoot in Vreg. The amount of Load Start current supplied by the FET is designed to be programmable in order to allow for a tradeoff between the Load Start and output overshoot transients. It is also possible to set the amount of $I_{LS}$ by use of feedback. In this circumstance, the amount of $I_{LS}$ supplied would be a function of the magnitude of the Load Start transient.

It is important to turn off the current from the Load Start FET once the current in the output inductor, IL, has increased sufficiently to supply the load current. The Load Start FET is turned off once the output of comparator #1 goes low. The $I_{LS}$ is allowed to decrease gradually, ideally at the same rate at which the current in the inductor is increasing (controlled by Rdis2 in the Load Start gate control circuit). This gradual decrease in $I_{LS}$ prevents a new Load Start Event which would occur had $I_{LS}$ been turned off immediately.

Figure 6:
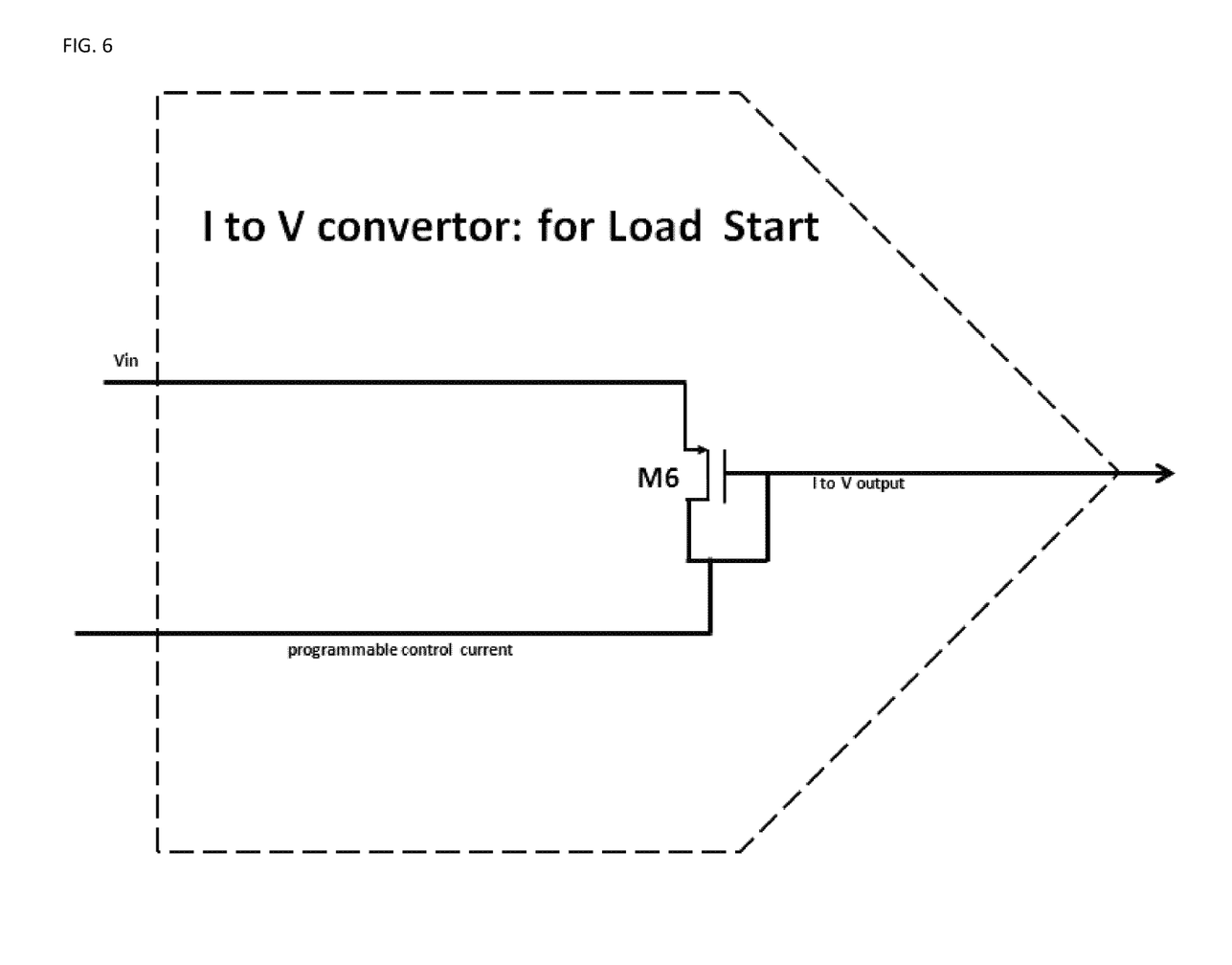
FIG. 6 shows a block diagram of a Load Start I to V converter.

FIG. 6 shows one implementation of an I to V converter suitable for use in the Load Release Gate Control Circuit. M4 is sized considerably smaller than M2 such that the magnitude of the programmable control current is small by comparison to $I_{LR}$. The op-amp is used to force the drain voltage of M4 equal to the same drain voltage as M2 (i.e. Vreg). This is necessary to insure accurate current matching between M2 and M4. The need for the op-amp and M5 is heightened for low Vreg voltages where M2 may be driven into its resistive region at larger I to V output voltages. FIG. 6 shows another variation of an I to V converter suitable for use in driving the Load Start Gate Control Circuit. In this case the op-amp was eliminated as Vreg is sufficiently below the resistive region for M3 that the matching between M3 and M6 is reasonable.

Although the examples given above describe a dynamic charge/discharge circuit in fast transient Buck regulators, one skilled in the art will appreciate that the technique can be applied to other circuit functions for operation in similar fashion. It will be understood from the foregoing description that various modifications and changes may be made in the preferred and alternative embodiments of the present invention without departing from its true spirit. For example, the FETs may be implemented using MOS transistors, bipolar transistors, or other suitable switching devices, the circuit may include a subset or superset of the elements described in the examples above, the method may be performed in a different sequence, the components provided may be integrated or separate, the devices included herein may be manually and/or automatically activated to perform the desired operation.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A buck converter, comprising:
   a first switching circuit including a first upper power transistor coupled to a first lower power transistor at a first junction;
   a second power transistor coupled to a second lower power transistor at a second junction;
   an inductor coupled to the first and second junctions; and
   a load coupled to the second junction and a current to voltage (I to V) converter that transforms a small current into a gate drive voltage (I to V) including a load start FET and a load release FET that generates increased currents to the load start FET and load release FET.

2. The buck converter of claim 1, wherein the converter comprises an I to V converter.

3. The buck converter of claim 1, wherein the converter comprises a load start I to V converter.

4. The buck converter of claim 1, wherein the converter comprises a load release I to V converter.

5. The buck converter of claim 1, comprising an FET supplying a load start current that is programmable.

6. The buck converter of claim 1, wherein the second lower power transistor turns on when an output voltage falls below a predetermined voltage, and turns off when the output voltage rises above a predetermined voltage.

7. The buck converter of claim 6, comprising a load start detector.

8. The buck converter of claim 6, wherein one FET is connected to a voltage rail.

9. The buck converter of claim 6, comprising a Load Start Gate Control that controls a load start current from the FET and a rate at which the load start current is allowed to decrease.

10. The buck converter of claim 7 comprising a load start current that is made to decrease gradually after an output voltage increases above the load start threshold.

11. The buck converter of claim 7 where an input voltage to the load start transistor connected to the output is supplied by a voltage less than an input voltage but greater than the output voltage.

12. The buck converter of claim 7 which uses different thresholds for the detecting a start of a load start transient and an end of the load start transient.

13. The buck converter of claim 1, wherein the second lower power transistor turns on when an output voltage exceeds a predetermined voltage and turns off when the output voltage drops below a predetermined voltage.

14. The buck converter of claim 13, comprising a Load Release detector.

15. The buck converter of claim 13, wherein the FET is connected to a voltage rail.

16. The buck converter of claim 13, comprising a Load Release Gate Control which controls a load release current from the FET.

17. The buck converter of claim 14 comprising a load release current that is made to decrease gradually after an output voltage decreases below the load release threshold.

18. The buck converter of claim 14 where the input voltage to the load release transistor is greater than ground level but less than the output voltage.

19. The buck converter of claim 14 which uses different thresholds for detecting a start of the load release transient and an end of a load release transient.

* * * * *